(12) United States Patent
Singh

(10) Patent No.: US 12,458,378 B2
(45) Date of Patent: Nov. 4, 2025

(54) ULTRASONIC SYSTEM AND METHOD HAVING IMPROVED OCCLUSION ENGAGEMENT DURING CROSSING AND ATHERECTOMY PROCEDURES

(71) Applicant: C.R. Bard, Inc., Franklin Lakes, NJ (US)

(72) Inventor: Aseem Singh, Tempe, AZ (US)

(73) Assignee: C.R. Bard, Inc., Franklin Lakes, NJ (US)

( * ) Notice: Subject to any disclaimer, the term of this patent is extended or adjusted under 35 U.S.C. 154(b) by 763 days.

(21) Appl. No.: 17/615,956

(22) PCT Filed: Jun. 18, 2019

(86) PCT No.: PCT/US2019/037608
§ 371 (c)(1),
(2) Date: Dec. 2, 2021

(87) PCT Pub. No.: WO2020/256693
PCT Pub. Date: Dec. 24, 2020

(65) Prior Publication Data
US 2022/0313293 A1    Oct. 6, 2022

(51) Int. Cl.
*A61B 17/22* (2006.01)
*A61B 17/32* (2006.01)
*A61B 17/00* (2006.01)

(52) U.S. Cl.
CPC ......... *A61B 17/22012* (2013.01); *A61B 17/320068* (2013.01); *A61B 2017/00477* (2013.01); *A61B 2017/22014* (2013.01)

(58) Field of Classification Search
None
See application file for complete search history.

(56) References Cited

U.S. PATENT DOCUMENTS

| 5,628,743 A | 5/1997 | Cimino |
| 6,080,170 A | 6/2000 | Nash et al. |

(Continued)

FOREIGN PATENT DOCUMENTS

| CN | 101208045 B | 6/2012 |
| WO | 2016081026 A1 | 5/2016 |
| WO | 2018089197 A1 | 5/2018 |

OTHER PUBLICATIONS

International Search Report and Written Opinion issued Jan. 15, 2020, by the International Searching Authority for Application No. PCT/US2019/037608, filed Jun. 18, 2019, 14 pages.

(Continued)

*Primary Examiner* — Patricia J Park
(74) *Attorney, Agent, or Firm* — Dinsmore & Shohl LLP

(57) ABSTRACT

An ultrasonic system includes an ultrasonic device having an ultrasonic transducer, and a core wire having a proximal end coupled to the ultrasonic transducer and a distal end portion that terminates at a distal tip. An ultrasonic energy source is electrically connected to the ultrasonic transducer. The ultrasonic energy source includes an ultrasonic signal generator circuit, a modulator circuit, and a controller. The ultrasonic signal generator circuit generates an ultrasonic electrical signal. The modulator circuit amplitude modulates the ultrasonic electrical signal with a macro-motion electrical signal to generate a modulated ultrasonic electrical signal. The controller executes program instructions to select between an engagement mode and a transverse mode, wherein in the engagement mode the first ultrasonic electrical signal is supplied from the ultrasonic energy source to the ultrasonic transducer and in the transverse mode the modulated ultrasonic electrical signal is supplied from the ultrasonic energy source to the ultrasonic transducer.

20 Claims, 3 Drawing Sheets

(56) References Cited

U.S. PATENT DOCUMENTS

| | | | |
|---|---|---|---|
| 6,524,323 | B1 | 2/2003 | Nash et al. |
| 6,843,797 | B2 | 1/2005 | Nash et al. |
| 7,367,982 | B2 | 5/2008 | Nash et al. |
| 7,981,129 | B2 | 7/2011 | Nash et al. |
| 8,192,391 | B2 | 6/2012 | Soltani et al. |
| 8,193,683 | B2 | 6/2012 | Oguzman et al. |
| 8,335,555 | B2 | 12/2012 | Lehman |
| 8,702,609 | B2 | 4/2014 | Hadjicostis |
| 9,649,171 | B2 | 5/2017 | Sankaran et al. |
| 2008/0058648 | A1 | 3/2008 | Novak |
| 2010/0268088 | A1* | 10/2010 | Prus ................. A61N 7/02 600/459 |
| 2011/0105958 | A1 | 5/2011 | Babaev |
| 2011/0213279 | A1 | 9/2011 | Britva |
| 2012/0238946 | A1 | 9/2012 | Nita et al. |
| 2013/0023897 | A1 | 1/2013 | Wallace |
| 2013/0237820 | A1* | 9/2013 | Vappou ............ A61B 8/0858 382/131 |
| 2014/0276684 | A1 | 9/2014 | Huennekens et al. |
| 2015/0066818 | A1 | 3/2015 | Choi et al. |
| 2016/0051323 | A1 | 2/2016 | Stigall et al. |
| 2016/0242805 | A1 | 8/2016 | Kohler et al. |
| 2018/0132875 | A1* | 5/2018 | Singh ............ A61M 25/09041 |
| 2019/0091490 | A1* | 3/2019 | Alexander ............ A61N 7/00 |
| 2019/0321061 | A1* | 10/2019 | Panian ............ A61B 17/2202 |

OTHER PUBLICATIONS

Japanese Office Action dated May 30, 2023 pertaining to Japanese application No. 2021575254 filed Dec. 17, 2021, pp. 1-12.
Office Action dated Mar. 29, 2025 pertaining to CN 201980097618.5 filed Dec. 17, 2021.

* cited by examiner

ULTRASONIC SYSTEM AND METHOD HAVING IMPROVED OCCLUSION ENGAGEMENT DURING CROSSING AND ATHERECTOMY PROCEDURES

CROSS-REFERENCE TO RELATED APPLICATIONS

This application is a U.S. national phase of International Application No. PCT/US2019/037608, filed Jun. 18, 2019, which is incorporated herein by reference in its entirety.

TECHNICAL FIELD

The present invention relates to ultrasonic systems and methods, and more particularly, to an ultrasonic system and method having improved occlusion engagement during crossing and atherectomy procedures.

BACKGROUND ART

Surgical procedures, such as a crossing procedure or an atherectomy procedure, are used to restore patency and blood flow that was lost due to one or more intravascular occlusions. A crossing procedure is a procedure in which an opening is formed through the intravascular occlusion. An atherectomy procedure may include crossing, but also attempts to break up and remove the intravascular occlusion. An ultrasonic system having an ultrasonic catheter may be used in performing crossing and atherectomy procedures.

The intravascular occlusion may be in the form of a calcified vascular occlusion having hard proximal and distal end caps. During an ultrasonic crossing or atherectomy procedure, a distal tip of the ultrasonic catheter engages the proximal end cap of the calcified vascular occlusion. However, because of the hardness of the proximal end cap of the calcified vascular occlusion, the distal tip of the ultrasonic catheter may unintentionally bounce off of the proximal end cap and take a sub-intimal migration path into the side wall of the vasculature.

What is needed in the art is a system and method wherein the distal tip of the ultrasonic catheter more reliably engages and anchors into the proximal end cap of the intravascular occlusion at the beginning portion of the crossing or atherectomy procedure, so as to reduce the possibility of the distal tip of the ultrasonic catheter taking an unintentional sub-intimal migration path. Also other applications of an ultrasonic catheter, also outside the human body, are considered.

SUMMARY OF INVENTION

The present invention provides a system and method wherein the distal tip of the ultrasonic catheter more reliably engages and anchors into the proximal end cap at the beginning portion of the crossing or atherectomy procedure, so as to reduce the possibility of the distal tip of the ultrasonic catheter taking an unintentional sub-intimal migration path. Also other applications of an ultrasonic catheter, also outside the human body, are considered.

The invention in one form is directed to an ultrasonic system that includes an ultrasonic device having an ultrasonic transducer, and a core wire having a proximal end and a distal end portion that terminates at a distal tip. The proximal end is coupled to the ultrasonic transducer. An ultrasonic energy source is electrically connected to the ultrasonic transducer. The ultrasonic energy source includes an ultrasonic signal generator circuit, a modulator circuit, and a controller. The ultrasonic signal generator circuit is configured to generate a first ultrasonic electrical signal having a first ultrasonic frequency. The modulator circuit is configured to amplitude modulate the first ultrasonic electrical signal with a macro-motion electrical signal to generate a modulated ultrasonic electrical signal. The macro-motion electrical signal has a frequency that is at least 350 times less than the ultrasonic frequency of the first ultrasonic electrical signal. The controller is communicatively coupled to the ultrasonic energy source. The controller executes program instructions to select between an engagement mode and a transverse mode, wherein in the engagement mode the first ultrasonic electrical signal is supplied from the ultrasonic energy source to the ultrasonic transducer and in the transverse mode the modulated ultrasonic electrical signal is supplied from the ultrasonic energy source to the ultrasonic transducer.

The invention in another form is directed to a method of operating an ultrasonic catheter coupled to an ultrasonic energy source, the ultrasonic catheter having a core wire coupled to an ultrasonic transducer, and the ultrasonic transducer being coupled to the ultrasonic energy source, the method including: providing an engagement mode in which the ultrasonic energy source generates an ultrasonic electrical signal having a first frequency, the ultrasonic electrical signal being supplied to the ultrasonic transducer to establish a continuous wave at an ultrasonic vibrational frequency in a distal end portion of the core wire, wherein the continuous wave produces vibrational motion of the distal end portion of the core wire that has substantially only longitudinal vibrational motion; providing a transverse mode in which the ultrasonic electrical signal is amplitude modulated with a macro-motion electrical signal having a second frequency at least 350 times less than the first frequency to establish a modulated continuous wave at a modulated ultrasonic vibrational frequency in the distal end portion of the core wire, wherein the modulated continuous wave produces vibrational motion of the distal end portion of the core wire that has a combination of longitudinal vibrational motion and transverse vibrational motion; operating the ultrasonic catheter in the engagement mode for a first time duration; and operating the ultrasonic catheter in the transverse mode for a second time duration following the first time duration of the engagement mode.

The invention in still another form is directed to a method of operating an ultrasonic catheter coupled to an ultrasonic energy source, the ultrasonic catheter having a core wire coupled to an ultrasonic transducer, and the ultrasonic transducer being coupled to the ultrasonic energy source, the method including: providing an engagement mode in which the ultrasonic energy source generates an ultrasonic electrical signal having an ultrasonic frequency, wherein the engagement mode is effected by adjusting an output energy level of the ultrasonic energy source to a first output energy level to effect substantially only longitudinal vibrational motion of the distal end portion of the core wire; providing a transverse mode, wherein the output energy level of the ultrasonic energy source increases from the first output energy level to a second output energy level higher than the first output energy level to effect a combination of longitudinal vibrational motion of the distal end portion of the core wire and transverse vibrational motion of the distal end portion of the core wire; operating the ultrasonic catheter in the engagement mode for a first time duration; and operating the ultrasonic catheter in the transverse mode for a second time duration following the first time duration of the engagement mode.

An advantage of the present invention is that in the engagement mode the distal tip of the ultrasonic catheter more reliably engages and anchors into the proximal end cap of the intravascular occlusion at a beginning portion of the crossing or atherectomy procedure, so that as the system transitions into the transverse mode, there is a reduced possibility of the distal tip of the ultrasonic catheter taking an unintentional sub-intimal migration path.

BRIEF DESCRIPTION OF DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
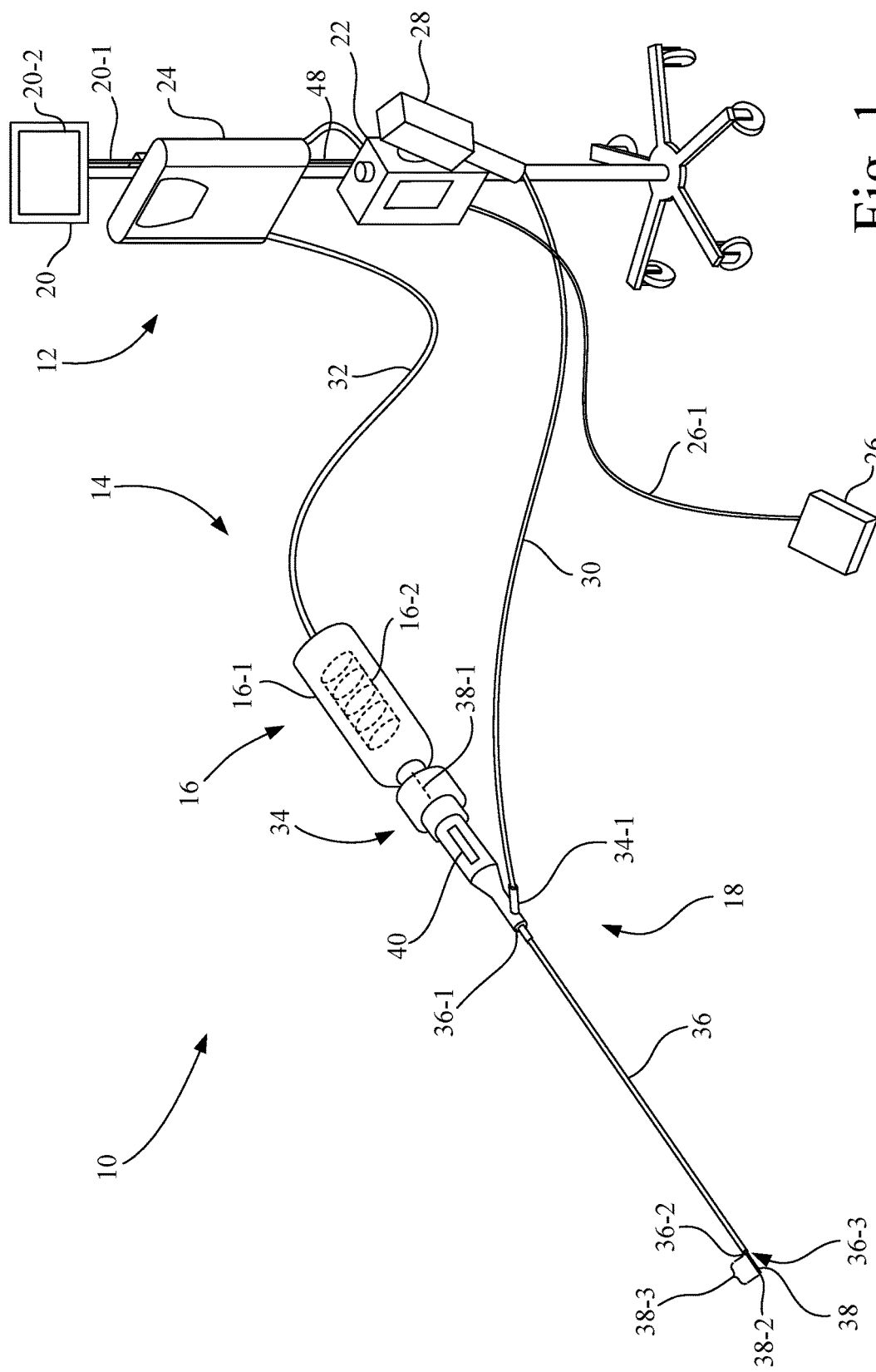
FIG. 1 is a pictorial representation of an ultrasonic system in accordance with an embodiment of the present invention for performing crossing and atherectomy procedures.

Referring now to the drawings, and more particularly to FIG. 1, there is shown an ultrasonic system 10 in accordance with an embodiment of the present invention for performing crossing and atherectomy procedures.

Ultrasonic system 10 may include a console 12 and an ultrasonic device 14. Ultrasonic device 14 includes a handpiece 16 and an ultrasonic catheter 18. Ultrasonic catheter 18 is detachably attached to handpiece 16.

Console 12 includes a user interface 20, a controller 22, and an ultrasonic energy source 24. Console 12 may include multiple components in a single housing unit or in separate housing units. Optionally, console 12 also may include a foot switch 26 and/or a saline injector 28.

In the present embodiment, handpiece 16 includes a housing body 16-1 and an ultrasonic transducer 16-2 mounted internally to housing body 16-1. Housing body 16-1 has an outer shape and size to facilitate being grasped by an operator during a crossing or atherectomy procedure.

Ultrasonic transducer 16-2 may be, for example, a piezoelectric-type transducer. Ultrasonic transducer 16-2 of handpiece 16 is electrically connected to ultrasonic energy source 24 by an electrical cable 32, and is configured to receive and convert the ultrasonic electrical signals generated by ultrasonic energy source 24 into ultrasonic vibrational energy, which may be in a frequency range corresponding to that of the ultrasonic electrical signal.

In the present embodiment, ultrasonic catheter 18 includes a housing 34, a sheath 36, and a core wire 38.

Housing 34 includes a Y-connector 34-1 that provides access to an irrigation lumen (not shown) of sheath 36. Y-connector 34-1 is connected, e.g., by flexible hose 30, to saline injector 28. In the present embodiment, housing 34 further includes a retraction-extension mechanism 40, such as a slide, that is connected to sheath 36.

Sheath 36 is an elongate flexible tube, such as a polymer tube. Sheath 36 includes a proximal end 36-1, a distal end 36-2, and a sheath lumen 36-3. In the present embodiment, sheath lumen 36-3 is an elongate lumen that longitudinally extends within sheath 36 from proximal end 36-1 to distal end 36-2, and may be formed as a central lumen, relative to the diameter, of sheath 36. Proximal end 36-1 of sheath 36 is connected to housing 34, and more particularly in the present embodiment, to retraction-extension mechanism 40.

Core wire 38 is an elongate flexible metal wire, e.g., nitinol, that is located in, and longitudinally extends within, sheath lumen 36-3 of sheath 36. In the present embodiment, core wire 38 may have a length greater than 60 centimeters (cm), and in some embodiments, a length of 100 to 200 cm. Core wire 38 has a proximal end 38-1, a distal tip 38-2, and a distal end portion 38-3.

Proximal end 38-1 of core wire 38 is operably connected to ultrasonic transducer 16-2, e.g., by a sonic connector, to receive the vibrational energy from ultrasonic transducer 16-2 so as to produce a vibrational motion of core wire 38. In accordance with the present invention, the vibrational motion of core wire 38 may be longitudinal or a combination of longitudinal and transverse vibration, depending upon a mode of operation.

For example, if the frequency of the ultrasonic electrical signal generated by ultrasonic energy source 24 and supplied to ultrasonic transducer 16-2 is 20 kHz, then the vibrational frequency of a longitudinal vibration of distal end portion 38-3 of core wire 38 correspondingly may be 20 kHz, and when the ultrasonic electrical signal is amplitude modulated by a low frequency modulation signal, e.g., 1 Hz-50 Hz, then transverse vibrations accompany the longitudinal vibrations at distal end portion 38-3 of core wire 38.

Distal tip 38-2 of core wire 38 may be, for example, a blunt tip, e.g., a rounded tip, that is not pointed. In practice, core wire 38 is advanced into a blood vessel of the vasculature having a vascular occlusion, wherein distal tip 38-2 of core wire 38 engages the vascular occlusion.

Distal end portion 38-3 extends proximally from distal tip 38-2, and distal end portion 38-3 distally terminates at distal tip 38-2. In the present embodiment, distal end portion 38-3 may have a portion of reduced diameter proximal to and spaced from distal tip 38-2.

In the present embodiment, retraction-extension mechanism 40 of housing 34 is configured to retract sheath 36 from a first, fully extended position of sheath 36 (as shown in FIG. 1) in which distal end portion 38-3 of core wire 38, e.g., 5 cm to 8 cm, extends distally from distal end 36-2 of sheath 36, to a fully retracted position of sheath 36, in which core wire 38 is wholly disposed within the sheath lumen 36-3 of sheath 36. Alternatively, however, it is contemplated that core wire 38 may be slidably moved relative to sheath 36 to fully extend core wire 38 to expose distal end portion 38-3 of core wire 38 distally from distal end 36-2 of sheath 36, and to fully retract core wire 38 to cover distal end portion 38-3 of core wire 38 with sheath 36.

Foot switch 26 is connected to controller 22 via an electrical cable 26-1. Foot switch 26 may provide auxiliary input signals to controller 22, which in turn controller 22 may use to activate and deactivate system components, e.g., ultrasonic energy source 24 and/or saline injector 28 of ultrasonic system 10.

Saline injector 28 is connected to controller 22 via an electrical cable 28-1. As depicted in FIG. 1, saline injector 28 is in fluid communication with ultrasonic catheter 18 via a flexible hose 30. Saline injector 28 may selectively deliver sterile saline to ultrasonic catheter 18, which in turn may be used to irrigate an anatomical area undergoing an intravascular occlusion-modification procedure and/or for cooling motional components, e.g., core wire 38, of the ultrasonic catheter 18.

Figure 2:
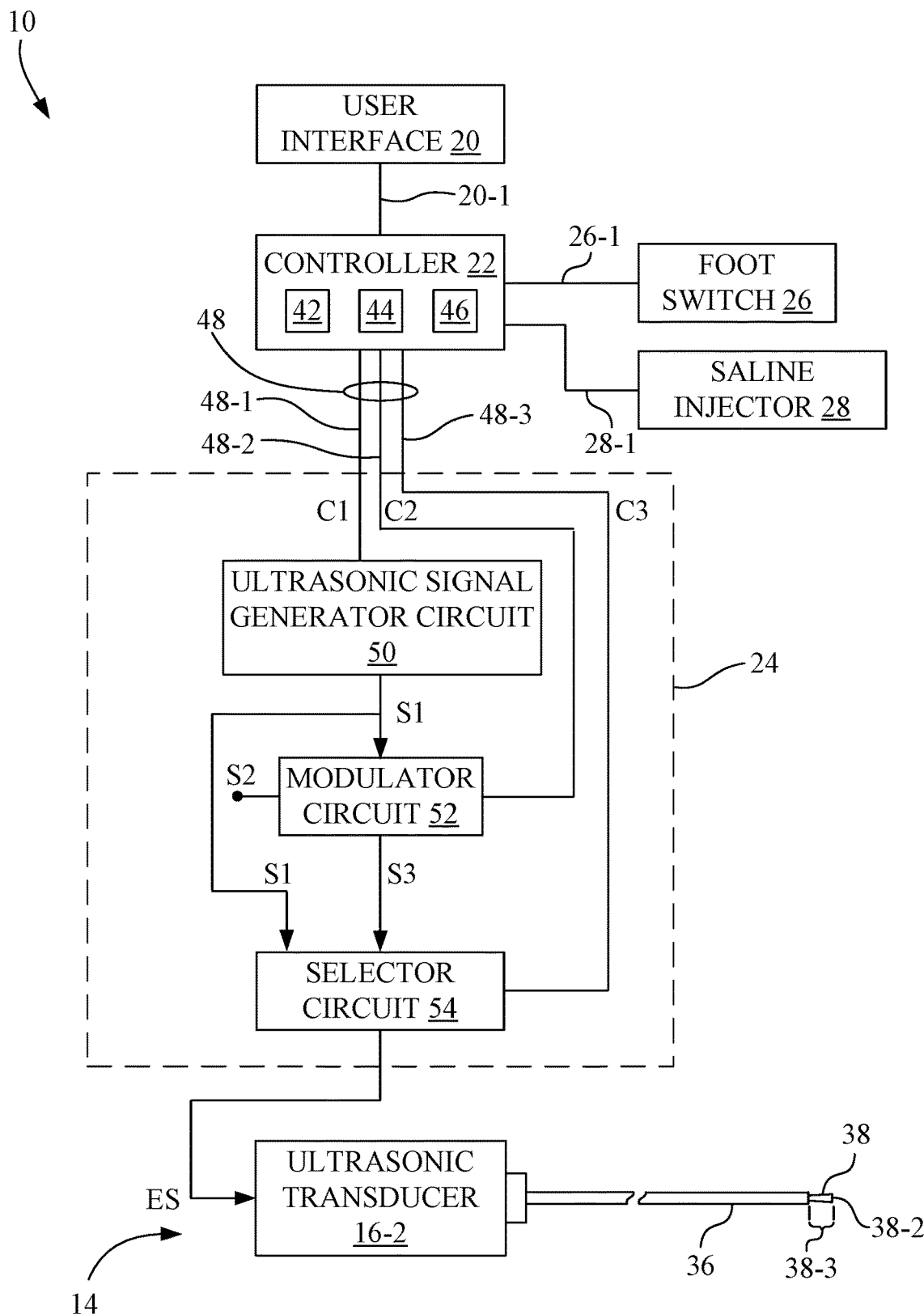
FIG. 2 is a block diagram of a portion of the ultrasonic system of FIG. 1, in accordance with an aspect of the present invention.

Referring also to FIG. 2, user interface 20 is connected to controller 22 via an electrical cable 20-1, e.g., a multi-wire cable or USB, to provide electrical and communication interconnection. Alternatively, user interface 20 may be a wireless link, e.g., Bluetooth, which is communicatively coupled to controller 22. User interface 20 may include, for example, a touchscreen display 20-2 (see FIG. 1) and associated input and output processing circuitry. Touchscreen display 20-2 may include, for example, a liquid crystal display (LCD) or a light-emitting diode (LED) display. Alternatively, user interface 20 may be in the form of a laptop computer or tablet. User interface 20 is configured to generate control signals based on user input received by touchscreen display 20-2. For example, a user may operate touchscreen display 20-2 of user interface 20 to provide the control signals to controller 22 to initiate and/or terminate operation of ultrasonic energy source 24, and to selectively start of stop saline injector 28.

Referring particularly to FIG. 2, controller 22 is electrically connected and communicatively coupled to each of user interface 20 and ultrasonic energy source 24. Controller 22 includes a processor circuit 42, interface circuitry 44, and electronic memory circuit 46.

Processor circuit 42 may include one or more programmable microprocessors and associated circuitry, such as an input/output interface, clock, buffers, memory, etc. Processor circuit 42 may be programmed, e.g., through software or firmware stored in memory circuit 46, to execute program instructions to process received input data, and to generate and send output data.

Interface circuitry 44 includes input and output circuits to facilitate electrical connection and data transfer with user interface 20 and ultrasonic energy source 24.

Memory circuit 46 is an electronic non-transitory memory having a plurality of data storage locations, as is well known in the art. Memory circuit 46 may include one or more of volatile memory circuits, such as random access memory (RAM), and non-volatile memory circuits, such as read only memory (ROM), electronically erasable programmable ROM (EEPROM), NOR flash memory, NAND flash memory, etc. Memory circuit 46 may be used, for example, to store program instructions to be executed by processor circuit 42.

Controller 22 executes program instructions to process signals received from touchscreen display 20-2 (see FIG. 1) of user interface 20, and executes program instructions to provide output control signals C1, C2, and C3 (see FIG. 2) to ultrasonic energy source 24 to control the operation of ultrasonic energy source 24.

Ultrasonic energy source 24 is connected to controller 22 via an electrical cable 48. Electrical cable 48 includes electrical conductors 48-1, 48-2, and 48-3, each configured to carry respective output control signals C1, C2, and C3. Ultrasonic energy source 24 includes an ultrasonic signal generator circuit 50, a modulator circuit 52, and an electrically actuated selector circuit 54, e.g., an electronic switch circuit. While each of the circuits 50, 52, 54 may be implemented as an electrical/electronic component circuit, it is contemplated that, alternatively, one or more of the circuits may be implemented in software/firmware.

Ultrasonic signal generator circuit 50 is configured to generate an ultrasonic electrical signal S1, e.g., a high-frequency current, within a frequency range of 20 kHz to 150 kHz. More preferably, for example, the frequency of the ultrasonic electrical signal S1 may be in a range of 20 kHz to 40 kHz. In some applications, the ultrasonic frequency of ultrasonic electrical signal S1 may be, or may initially be, 20 kHz.

Modulator circuit 52 is an amplitude modulation circuit that is configured to receive ultrasonic electrical signal S1, and to amplitude modulate ultrasonic electrical signal S1 with a macro-motion electrical signal S2 to generate a modulated ultrasonic electrical signal S3. The macro-motion electrical signal S2 is a low frequency modulation signal defined herein as an electrical signal having a frequency at least 350 times less than the frequency of ultrasonic electrical signal S1. For example, the frequency of macro-motion electrical signal S2 may be in a range of 1 Hz-50 Hz.

Selector circuit 54 is operated by controller 22 to select one of ultrasonic electrical signal S1 and modulated ultrasonic electrical signal S3 as the excitation signal ES to be supplied to ultrasonic transducer 16-2.

In accordance with an aspect of the present invention, ultrasonic system 10 performs a crossing or atherectomy procedure by automatically progressing through an engagement mode to a transverse mode. In particular, controller 22 executes program instructions to select between an engagement mode and a transverse mode, and the selection is effected by operation of selector circuit 54, wherein in the engagement mode the ultrasonic electrical signal S1 is supplied from the ultrasonic energy source 24 to ultrasonic transducer 16-2 and in the transverse mode the modulated ultrasonic electrical signal S3 is supplied from ultrasonic energy source 24 to ultrasonic transducer 16-2.

The engagement mode is used to initially engage and to anchor distal tip 38-2 of core wire 38 into a proximal end cap of a vascular obstruction, such as a calcified vascular occlusion, based on the ultrasonic electrical signal S1 excitation of ultrasonic transducer 16-2. In the present context, the term "anchor" means that distal tip 38-2 of core wire 38 has penetrated into the proximal end cap to limit lateral movement of distal tip 38-2, but distal tip 38-2 is not necessarily attached to the proximal end cap of the vascular. The proximal end cap of the calcified vascular occlusion typically has an irregular shape, but may have a generally or locally convex or concave surface. Accordingly, anchoring is particularly helpful to prevent sub-intimal migration of distal tip 38-2 when the proximal end cap has a convex shape. Thus, by anchoring the distal tip 38-2 of core wire 38 into the proximal end cap of the calcified vascular occlusion, distal tip 38-2 of core wire 38 has a higher probability of remaining in the true lumen of the blood vessel, during the occlusion crossing or atherectomy procedure, without going sub-intimal.

For example, in the engagement mode, ultrasonic electrical signal S1 is generated at an ultrasonic frequency, e.g., 20 kHz, and the ultrasonic electrical signal S1 is supplied to ultrasonic transducer 16-2. The electrical power of ultrasonic electrical signal S1 supplied to ultrasonic transducer 16-2 is selected, e.g., by controller 22, so as to establish a continuous wave at an ultrasonic vibrational frequency in the distal end portion 38-3 of the core wire 38. The continuous wave produces vibrational motion of distal end portion 38-3 and distal tip 38-2 of core wire 38 that has substantially only longitudinal vibrational motion, so as to anchor distal tip 38-2 of core wire 38 into a proximal end cap of a calcified vascular occlusion based on the ultrasonic electrical signal S1 excitation of ultrasonic transducer 16-2. In the present embodiment, the longitudinal vibrational motion of the distal end portion 38-3 of core wire 38 is in a range of 20 microns to 40 microns.

As used herein, the term "substantially only longitudinal vibrational motion" means a longitudinal vibrational motion having essentially no accompanying transverse vibrational motion. The term "essentially no accompanying transverse vibrational motion" means less than 1 micron of transverse vibrational motion at any location along distal end portion 38-3 of the core wire 38.

The transverse mode follows the engagement mode. The transverse mode is used to more aggressively bore into and break up the vascular lesion based on the modulated ultrasonic electrical signal S3 excitation of ultrasonic transducer 16-2, such that the distal end portion 38-3 of core wire 38 is subject to a combination of longitudinal and transverse vibrational motion while remaining anchored in the calcified vascular occlusion until the crossing and/or breaking up of the vascular occlusion is complete. In the present embodiment, the longitudinal vibrational motion of the distal end portion 38-3 of core wire 38 is in a range of 20 microns to 40 microns and the transverse vibrational motion of the distal end portion 38-3 of core wire 38 is in a range of 3 microns to 10 microns.

For example, in the transverse mode, ultrasonic electrical signal S1, e.g., having a ultrasonic frequency of 20 kHz, is amplitude modulated with the macro-motion electrical signal S2, e.g., having a non-ultrasonic frequency at least 350 times less than the ultrasonic frequency of ultrasonic electrical signal S1, so as to generate the modulated ultrasonic electrical signal S3. The frequency of macro-motion electrical signal S2 may be, for example, in a range of 1 Hz to 50 Hz, or more particularly, a range of 5 Hz to 15 HZ. The amplitude modulated ultrasonic electrical signal S3 is supplied to ultrasonic transducer 16-2, which in turn establishes a modulated continuous wave at a modulated ultrasonic vibrational frequency in distal end portion 38-3 of core wire 38. The modulated continuous wave produces vibrational motion of distal end portion 38-3 (including distal tip 38-2) of core wire 38 that has a combination of longitudinal vibrational motion and transverse vibrational motion that is imparted to the calcified vascular occlusion based on the modulated ultrasonic electrical signal S3 excitation of ultrasonic transducer 16-2. In the present embodiment, the longitudinal vibrational motion of the distal end portion 38-3 of core wire 38 is in a range of 20 microns to 40 microns and the transverse vibrational motion of the distal end portion 38-3 of core wire 38 is in a range of 3 microns to 10 microns.

Figure 3:
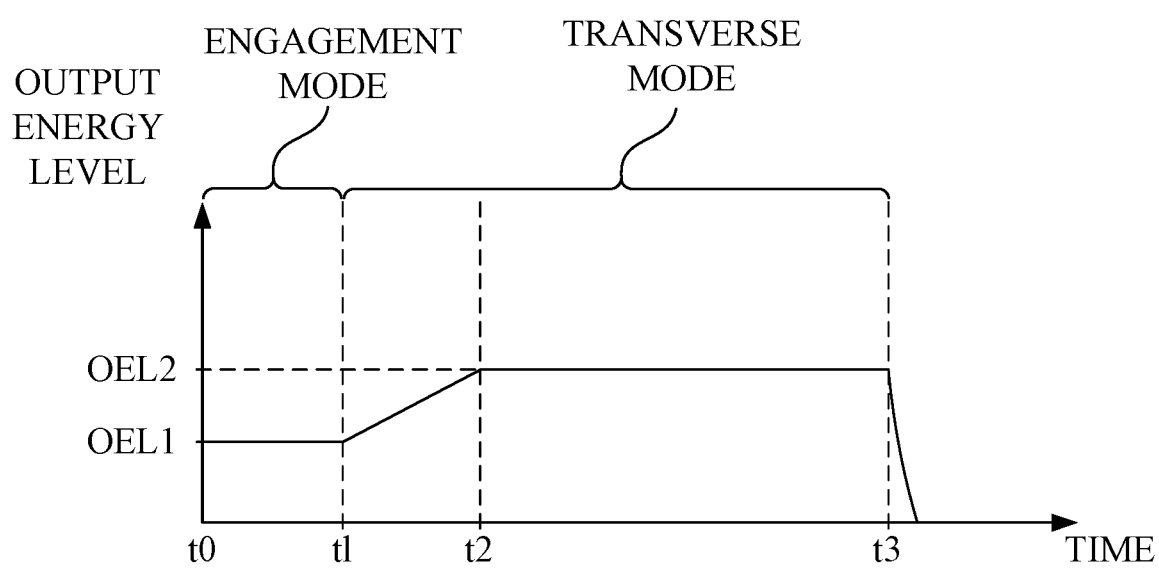
FIG. 3 is a graph representing the output energy level of the ultrasonic energy source vs. time, throughout the engagement mode and the transverse mode.

Referring also to FIG. 3, in operation, controller 22 executes program instructions such that ultrasonic system 10 operates in the engagement mode for a first time duration (t0-t1), and then operates in the transverse mode for a second time duration (t1-t3) following the first time duration (t0-t1) of the engagement mode. The first time duration (t0-t1) begins at time t0 when distal tip 38-2 of distal end portion 38-3 of core wire 38 contacts the proximal end cap of a calcified vascular occlusion in a blood vessel and the excitation signal ES (S1) is delivered to ultrasonic transducer 16-2. During the first time duration (t0-t1), distal tip 38-2 of core wire 38 penetrates the proximal end cap of the calcified vascular occlusion, so as to anchor distal end portion 38-3 of core wire 38 within the calcified vascular occlusion.

For example, the first time duration (t0-t1) may be 1 second to 3 seconds, and may be variable within that range based on such factors as the anticipated hardness/density of the proximal end cap of the vascular occlusion. In some procedures, a first time duration (t0-t1) of 1.75 seconds may be selected as an initial setting. The second time duration (t1-t3) is that which is required for distal tip 38-2 of core wire 38 to exit from the distal end cap of the vascular occlusion, i.e., is a time that is variable based on such factors as the length and density of the vascular occlusion, and whether the procedure is a crossing procedure or an atherectomy procedure. In an atherectomy procedure, distal end portion 38-3 of core wire 38 breaks up the calcified vascular occlusion.

A transition from the engagement mode into the transverse mode may occur as a smooth increase in the output energy level, i.e., power, current, and/or voltage, of ultrasonic energy source 24 during the time period (t1-t2) of the transverse mode, i.e., at the conclusion of the engagement mode.

For example, in the engagement mode, controller 22 executes program instructions to adjust an output energy level of ultrasonic energy source ultrasonic signal generator circuit 50 (e.g., the amplitude or frequency of ultrasonic electrical signal S1) to a first output energy level OEL1 to effect substantially only longitudinal vibrational motion of distal end portion 38-3 of core wire 38, i.e., with substantially no transverse vibrational motion of distal end portion 38-3 of core wire 38. The longitudinal vibrational motion of distal end portion 38-3 of core wire 38 continues at the first output energy level OEL1 for the first time duration (t0-t1) to anchor distal tip 38-2 of core wire 38 into the proximal end cap of the vascular occlusion.

In the transverse mode, controller 22 may execute program instructions such that the amplitude of the macro-motion electrical signal S2 that amplitude modulates ultrasonic electrical signal S1 is increased in accordance with a ramp profile during the time period (t1-t2), such that the output energy level of the modulated ultrasonic electrical signal S3 of ultrasonic energy source 24 increases from the first output energy level OEL1 to a second output energy level OEL2 gradually in accordance with the ramp profile. The ramp profile is bounded by the first output energy level OEL1 and the second output energy level OEL2. It is contemplated that the ramp profile may be linear, or alternatively, may be a curve, such as parabolic, exponential, or "S"-shaped.

In the transverse mode, an amount of transverse vibrational motion of distal end portion 38-3 of core wire 38 increases as the output energy level increases during the time period (t1-t2). The combination of longitudinal vibrational motion and transverse vibrational motion of distal end portion 38-3 of core wire 38 continues at the second output energy level OEL2 for the remainder (t2-t3) of the second time duration (t1-t3).

Stated differently, in the present embodiment, an output energy level of ultrasonic energy source 24 increases from the first output energy level OEL1 to the second output energy level OEL2 (higher than the first output energy level) by the introduction of the macro-motion electrical signal S2, i.e., by the amplitude modulation of the ultrasonic electrical signal S1 with the macro-motion electrical signal S2, wherein the amplitude of the macro-motion electrical signal S2 may be increased in accordance with the ramp profile during the time period (t1-t2), so as to smoothly increase the amount of transverse vibrational motion of distal end portion 38-3 of core wire 38.

While the present embodiment depicted in FIGS. 1 and 2 shows distal end portion 38-3 of core wire 38 extending from distal end 36-2 of sheath 36, it is to be recognized that the present invention may be practiced with ultrasonic catheter configurations wherein the distal end portion 38-3 is completely, or partially, contained in sheath 36, and/or with distal end portion 38-3 connected to distal end 36-2 of sheath 36, such as for example, as is the case with the Crosser® brand ultrasonic catheters available from BD/C. R. Bard, Inc.

The following items also relate to the invention:

In one form, the invention relates to an ultrasonic system. The ultrasonic system may include an ultrasonic device having an ultrasonic transducer, and a core wire having a proximal end and a distal end portion that terminates at a distal tip, the proximal end being coupled to the ultrasonic transducer. An ultrasonic energy source may be electrically connected to the ultrasonic transducer. The ultrasonic energy source may include an ultrasonic signal generator circuit and a modulator circuit. The ultrasonic signal generator circuit may be configured to generate a first ultrasonic electrical signal having a first ultrasonic frequency. The modulator circuit may be configured to amplitude modulate the first ultrasonic electrical signal, optionally with a macro-motion electrical signal, to generate a modulated ultrasonic electrical signal. The macro-motion electrical signal may have a frequency that is at least 350 times less than the ultrasonic frequency of the first ultrasonic electrical signal. A controller may be communicatively coupled to the ultrasonic energy source. The controller may be configured to execute program instructions to select between an engagement mode and a transverse mode, wherein in the engagement mode the first ultrasonic electrical signal is supplied from the ultrasonic energy source to the ultrasonic transducer and in the transverse mode the modulated ultrasonic electrical signal is supplied from the ultrasonic energy source to the ultrasonic transducer.

In any of the embodiments, the ultrasonic system may include a sheath having a sheath lumen, wherein the core wire is located in, and longitudinally extends within, the sheath lumen of the sheath.

In some of the embodiments, the distal end portion of the core wire may extend from a distal end of the sheath.

In any of the embodiments, in the engagement mode, the ultrasonic system may be controlled by the controller such that the ultrasonic transducer establishes a continuous wave at an ultrasonic vibrational frequency in the distal end portion of the core wire, wherein the continuous wave produces vibrational motion of the distal end portion of the core wire that has substantially only longitudinal vibrational motion.

In any of the embodiments, in the transverse mode, the ultrasonic system may be controlled by the controller such that the ultrasonic transducer establishes a modulated continuous wave that produces vibrational motion of the distal end portion of the core wire that has both longitudinal vibrational motion and transverse vibrational motion, wherein the longitudinal vibrational motion may be in a range of 20 microns to 40 microns and the transverse vibrational motion may be in a range of 3 microns to 10 microns.

In any of the embodiments, the frequency of the first ultrasonic electrical signal may be in a range of 20 kHz to 40 kHz and the frequency of the macro-motion electrical signal may be in a range of 1 Hz to 50 Hz.

In any of the embodiments, the controller may be configured to execute program instructions to operate in the engagement mode for a first time duration, and to operate in the transverse mode for a second time duration following the first time duration of the engagement mode.

In any of the embodiments, the ultrasonic energy source may be configured such that an output energy level of the ultrasonic energy source may increase from a first output energy level to a second output energy level higher than the first output energy level by the introduction of the macro-motion electrical signal.

In any of the embodiments, the ultrasonic energy source may be configured such that an amount of transverse vibrational motion increases as the output energy level increases, and wherein the transition from the first output energy level to the second output energy level may be in accordance with a ramp profile.

In any of the embodiments, an amplitude of the macro-motion electrical signal may increase in accordance with a ramp profile.

In another form, the invention relates to a method of operating an ultrasonic catheter coupled to an ultrasonic energy source, the ultrasonic catheter having a core wire coupled to an ultrasonic transducer, and the ultrasonic transducer being coupled to the ultrasonic energy source. The method may include providing an engagement mode in which the ultrasonic energy source generates an ultrasonic electrical signal having a first frequency, the ultrasonic electrical signal being supplied to the ultrasonic transducer to establish a continuous wave at an ultrasonic vibrational frequency in a distal end portion of the core wire, wherein the continuous wave produces vibrational motion of the distal end portion of the core wire that has substantially only longitudinal vibrational motion; providing a transverse mode in which the ultrasonic electrical signal is amplitude modulated with an, optionally a macro-motion, electrical signal having a second frequency at least 350 times less than the first frequency to establish a modulated continuous wave at a modulated ultrasonic vibrational frequency in the distal end portion of the core wire, wherein the modulated continuous wave produces vibrational motion of the distal end portion of the core wire that has a combination of longitudinal vibrational motion and transverse vibrational motion; operating the ultrasonic catheter in the engagement mode for a first time duration; and operating the ultrasonic catheter in the transverse mode for a second time duration following the first time duration of the engagement mode.

In any of the embodiments, the first frequency of the ultrasonic electrical signal may be in a range of 20 kHz to 40 kHz and the second frequency of the macro-motion electrical signal may be in a range of 1 Hz to 50 Hz.

In some of the embodiments, the first frequency of the ultrasonic electrical signal may be 20 kHz and the second frequency of the macro-motion electrical signal may be in a range of 5 Hz to 15 Hz.

In any of the embodiments, in the engagement mode, the longitudinal vibrational motion may be in a range of 20 microns to 40 microns and the transverse vibrational motion is less than 1 micron.

In any of the embodiments, in the transverse mode, the longitudinal vibrational motion may be in a range of 20 microns to 40 microns and the transverse vibrational motion may be in a range of 3 microns to 10 microns.

In any of the embodiments, the first time duration may be 1 second to 3 seconds.

In any of the embodiments, the first time duration may begin when the distal tip of the distal end portion of the core wire contacts a proximal end cap of a calcified vascular occlusion in a blood vessel and an excitation signal is delivered to the ultrasonic transducer.

In any of the embodiments, during the first time duration, the distal tip of the core wire may penetrate a calcified vascular occlusion.

In any of the embodiments, during the second time duration, the distal end portion of the core wire may break up the calcified vascular occlusion.

In some of the embodiments, the amplitude of the macro-motion electrical signal may increase in accordance with a ramp profile.

In another form, the invention relates to a method of operating an ultrasonic catheter coupled to an ultrasonic energy source, the ultrasonic catheter having a core wire coupled to an ultrasonic transducer, and the ultrasonic transducer being coupled to the ultrasonic energy source. The method may include providing an engagement mode in which the ultrasonic energy source generates an ultrasonic electrical signal having an ultrasonic frequency, wherein the engagement mode may be effected by adjusting an output energy level of the ultrasonic energy source to a first output energy level to effect substantially only longitudinal vibrational motion of the distal end portion of the core wire; providing a transverse mode, wherein the output energy level of the ultrasonic energy source increases from the first output energy level to a second output energy level higher than the first output energy level to effect a combination of longitudinal vibrational motion of the distal end portion of the core wire and transverse vibrational motion of the distal end portion of the core wire; operating the ultrasonic catheter in the engagement mode for a first time duration; and operating the ultrasonic catheter in the transverse mode for a second time duration following the first time duration of the engagement mode.

In any of the embodiments, in the transverse mode, the output energy level of the ultrasonic energy source increases from the first output energy level to the second output energy level by amplitude modulating the ultrasonic electrical signal with an, optionally macro-motion, electrical signal, the macro-motion electrical signal having a frequency at least 350 times less than the ultrasonic frequency of the ultrasonic electrical signal.

In any of the embodiments, in the transverse mode, an amount of transverse vibrational motion increases as the output energy level increases, and the transition from the first output energy level to the second output energy level may be in accordance with a ramp profile.

In some of the embodiments, an amplitude of the macro-motion electrical signal may be increased in accordance with a ramp profile.

In some of the embodiments, an amplitude of the macro-motion electrical signal may be increased in accordance with a ramp profile to increase the output energy level of the ultrasonic energy source from the first output energy level to the second output energy level.

In some of the embodiments, the method may include continuing the longitudinal vibrational motion of the distal end portion of the core wire at the first output energy level for the first time duration to anchor a distal tip of the core wire in a proximal end cap of an occlusion; increasing the output energy level according to a predetermined ramp profile during the second time duration to produce the combination of longitudinal vibrational motion and transverse vibrational motion of the distal end portion of the core wire, with an amount of transverse vibrational motion increasing as the output energy level increases, and the ramp profile being bounded by the first output energy level and a second output energy level; and continuing the combination of longitudinal vibrational motion and transverse vibrational motion of the distal end portion of the core wire at the second output energy level for a remainder of the second time duration, wherein the second time duration may be a variable time.

In any of the embodiments, the first time duration may be in a range of 1.0 to 3.0 seconds.

In some of the embodiments, the first time duration may be 1.75 seconds.

As used herein, "substantially," "generally", and other words of degree are relative modifiers intended to indicate permissible variation from the characteristic so modified. For example, unless otherwise specified, the term "substantially" is directed to that of approaching or approximating such a physical or functional characteristic which it modifies. Also, as used herein, a specified range of "X to Y" includes the X and Y boundaries of the range.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An ultrasonic system, comprising:
   an ultrasonic device having an ultrasonic transducer, and a core wire having a proximal end and a distal end portion that terminates at a distal tip, the proximal end being coupled to the ultrasonic transducer;
   an ultrasonic energy source electrically connected to the ultrasonic transducer, the ultrasonic energy source including:
   an ultrasonic signal generator circuit configured to generate a first ultrasonic electrical signal having a first ultrasonic frequency; and
   a modulator circuit configured to amplitude modulate the first ultrasonic electrical signal with a macro-motion electrical signal which interacts with the first ultrasonic electrical signal to generate a modulated ultrasonic electrical signal, the macro-motion electrical signal having a frequency that is at least 350 times less than the ultrasonic frequency of the first ultrasonic electrical signal; and
   a controller communicatively coupled to the ultrasonic energy source, the controller configured to execute program instructions to select between an engagement mode outputting the first ultrasonic electrical signal to anchor the distal tip in a lesion and a transverse mode outputting the modulated ultrasonic electrical signal to break up the lesion.

2. The ultrasonic system according to claim 1, comprising a sheath having a sheath lumen, the core wire located in, and longitudinally extends within, the sheath lumen of the sheath.

3. The ultrasonic system according to claim 2, wherein the distal end portion of the core wire extends from a distal end of the sheath.

4. The ultrasonic system according to claim 1, wherein in the engagement mode, the ultrasonic transducer establishes a continuous wave at an ultrasonic vibrational frequency in the distal end portion of the core wire, wherein the continuous wave produces vibrational motion of the distal end portion of the core wire that has substantially only longitudinal vibrational motion.

5. The ultrasonic system according to claim 1, wherein in the transverse mode, the ultrasonic transducer establishes a modulated continuous wave that produces vibrational motion of the distal end portion of the core wire that has both longitudinal vibrational motion and transverse vibrational motion, wherein the longitudinal vibrational motion is in a range of 20 microns to 40 microns and the transverse vibrational motion is in a range of 3 microns to 10 microns.

6. The ultrasonic system according to claim 1, wherein the frequency of the first ultrasonic electrical signal is in a range of 20 kHz to 40 kHz and the frequency of the macro-motion electrical signal is in a range of 1 Hz to 50 Hz.

7. The ultrasonic system according to claim 1, wherein the controller executes program instructions to operate in the engagement mode for a first time duration, and to operate in the transverse mode for a second time duration following the first time duration of the engagement mode.

8. The ultrasonic system according claim 1, wherein an output energy level of the ultrasonic energy source increases from a first output energy level to a second output energy level higher than the first output energy level by the introduction of the macro-motion electrical signal.

9. The ultrasonic system according to claim 8, wherein an amount of transverse vibrational motion increases as the output energy level increases, and wherein the transition from the first output energy level to the second output energy level is in accordance with a ramp profile.

10. The ultrasonic system according to claim 1, wherein an amplitude of the macro-motion electrical signal is increased in accordance with a ramp profile.

11. A method of operating an ultrasonic catheter coupled to an ultrasonic energy source, the ultrasonic catheter having a core wire coupled to an ultrasonic transducer, and the ultrasonic transducer being coupled to the ultrasonic energy source, the method comprising:
providing an engagement mode configured to anchor a distal tip of the ultrasonic catheter within a lesion in which the ultrasonic energy source generates an ultrasonic electrical signal having a first frequency, the ultrasonic electrical signal being supplied to the ultrasonic transducer to establish a continuous wave at an ultrasonic vibrational frequency in a distal end portion of the core wire, wherein the continuous wave produces vibrational motion of the distal end portion of the core wire that has substantially only longitudinal vibrational motion;
providing a transverse mode configured to break up the lesion with the distal tip in which the ultrasonic electrical signal is amplitude modulated with a macro-motion electrical signal having a second frequency at least 350 times less than the first frequency which interacts with the ultrasonic electrical signal to establish a modulated continuous wave at a modulated ultrasonic vibrational frequency in the distal end portion of the core wire, wherein the modulated continuous wave produces vibrational motion of the distal end portion of the core wire that has a combination of longitudinal vibrational motion and transverse vibrational motion;
operating the ultrasonic catheter in the engagement mode for a first time duration; and
operating the ultrasonic catheter in the transverse mode for a second time duration following the first time duration of the engagement mode.

12. The method according to 11, wherein the first frequency of the ultrasonic electrical signal is in a range of 20 kHz to 40 kHz and the second frequency of the macro-motion electrical signal is in a range of 1 Hz to 50 Hz.

13. The method according to 11, wherein the first frequency of the ultrasonic electrical signal is 20 kHz and the second frequency of the macro-motion electrical signal is in a range of 5 Hz to 15 Hz.

14. The method according to claim 11, wherein in the engagement mode the longitudinal vibrational motion is in a range of 20 microns to 40 microns and the transverse vibrational motion is less than 1 micron.

15. The method according to claim 11, wherein in the transverse mode the longitudinal vibrational motion is in a range of 20 microns to 40 microns and the transverse vibrational motion is in a range of 3 microns to 10 microns.

16. The method according to claim 11, wherein the first time duration is 1 second to 3 seconds.

17. The method according to claim 11, wherein the first time duration begins when the distal tip of the distal end portion of the core wire contacts a proximal end cap of a calcified vascular occlusion in a blood vessel and an excitation signal is delivered to the ultrasonic transducer.

18. The method according to claim 11, wherein during the first time duration, the distal tip of the core wire penetrates the calcified vascular occlusion.

19. The method according to claim 17, wherein during the second time duration, the distal end portion of the core wire breaks up the calcified vascular occlusion.

20. The method according to claim 11, wherein the amplitude of the macro-motion electrical signal is increased in accordance with a ramp profile.

* * * * *